(No Model.)

T. B. NUTTING.
ROTARY CULTIVATOR.

No. 309,793. Patented Dec. 23, 1884.

WITNESSES:
Chas. Nida
C. Sedgwick

INVENTOR:
T. B. Nutting
BY Munn & Co
ATTORNEYS.

UNITED STATES PATENT OFFICE.

THOMAS B. NUTTING, OF MORRISTOWN, NEW JERSEY.

ROTARY CULTIVATOR.

SPECIFICATION forming part of Letters Patent No. 309,793, dated December 23, 1884.

Application filed June 3, 1884. (No model.)

*To all whom it may concern:*

Be it known that I, THOMAS B. NUTTING, of Morristown, in the county of Morris and State of New Jersey, have invented a new and useful Improvement in Rotary Cultivators, of which the following is a full, clear, and exact description.

Reference is to be had to the accompanying drawings, forming a part of this specification, in which similar letters of reference indicate corresponding parts in both figures.

Figure 1:
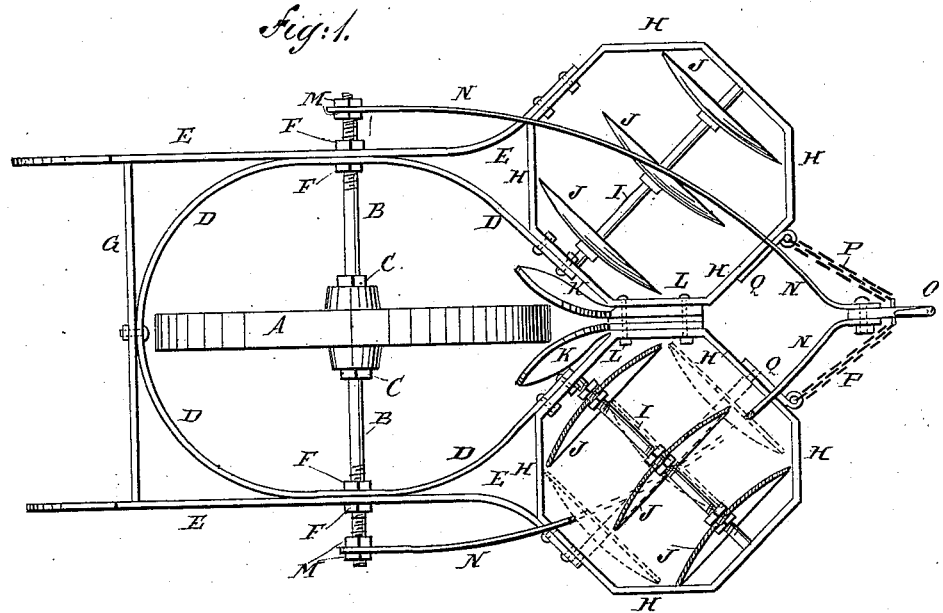
Figure 2:
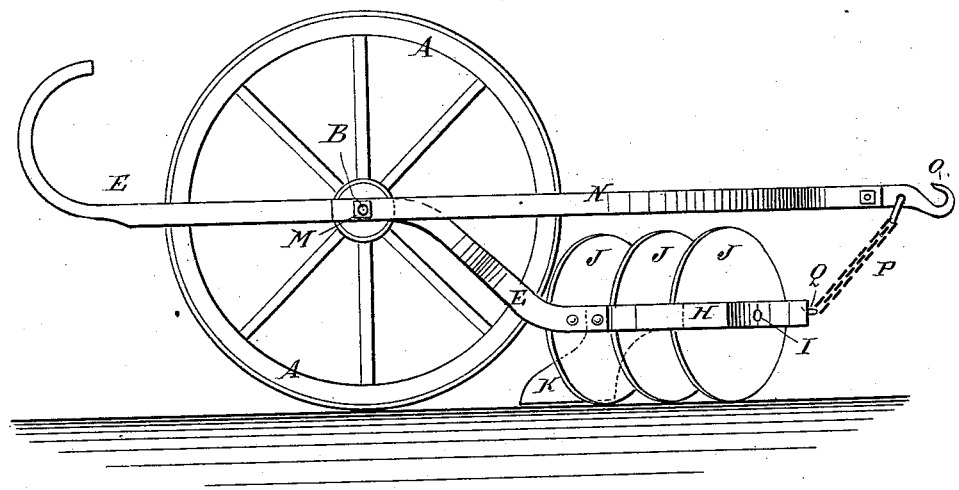

Figure 1 is a plan view of my improved cultivator, partly in section and part being broken away. Fig. 2 is a side elevation of the same.

The object of this invention is to facilitate the cultivation of corn and other crops planted in rows, and also to promote thoroughness in such cultivation.

The invention consists in a cultivator constructed with two sets of dish-shaped disks attached to shafts inclined from each other and journaled to frames connected with each other and with the axle of a single wheel. The frames carrying the shafts and disks are connected with the axle of the wheel by a bent bar and the handles of the machine, so that the machine can be readily guided and controlled. The draft-hook is connected with the axle of the wheel by bent bars, and with the polygonal frames carrying the shafts and disks by chains, so that the machine can be readily drawn. To the polygonal frames carrying the shafts and disks, at their point of connection, are attached scrapers to clean out the middle part of the furrow, all as hereinafter fully described, and pointed out in the claims.

A represents a wheel which revolves upon the center of the axle B, where it is kept in place by nuts or collars C.

To the axle B, at a little distance from its ends, are secured the arms of the bar D, and the handles E, which are fastened in place by nuts F, screwed upon the said axle at the outer and inner sides of the said arms and handles. The middle part of the bar D is bent into semicircular form to pass around the rear side of the wheel A, and is secured at its center to the center of the round G, attached at its ends to the rear parts of the handles E. The arms of the bar D are curved inward, downward, and forward, and are attached at their forward ends, at points a little in front of the forward side of the wheel A, to sides of the polygonal frames H. The forward parts of the handles E are curved downward, forward, and outward, and are attached at their forward ends to sides of the polygonal frames H.

I are two shafts, which incline from each other toward their forward ends, and the ends of which are journaled to sides of the polygonal frames H.

To each shaft I are secured, by nuts or other suitable means, three or more concaved or dish-shaped disks, J, with their concaved sides forward. With this construction, as the machine is drawn forward between two rows of plants the disks J will be revolved by the resistance of the soil, and will cut up and destroy the grass and weeds and will move the soil to and around the plants. The weeds and grass in the space between the inner or rear disks, J, will be destroyed, and the center of the furrow will be opened and cleaned by two plows or scrapers, K, the shanks of which project forward and are secured to and between the adjacent sides of the frames H by bolts L.

To the ends of the axle B are secured, by nuts M or other suitable means, the rear ends of the draw-bars N, which are curved inward, and their forward ends are bolted to the opposite sides of the shank of the draw-hook O.

To the draw-hook O are attached the forward ends of two short chains, P, the rear ends of which are attached, by means of the eye-plates Q or other suitable means, to the forward parts of the frames H, as shown in Figs. 1 and 2. With this construction the disks J can be raised from the ground when turning around and when passing from place to place by bearing down upon the handles E. By changing the positions of the shafts I and adjusting them to incline toward each other forward, the concaved disks J will throw the soil toward the plants, as indicated in dotted lines in Fig. 1.

Having thus described my invention, I claim as new and desire to secure by Letters Patent—

1. In a cultivator, the combination, with the wheel and axle A B, of the bent bar D, the handles E, the polygonal frames H, and the shafts and dish-shaped disks I J, substantially as herein shown and described.

2. In a cultivator, the combination, with the wheel and axle A B and the polygonal frames H, carrying the shafts and disks I J, of the draw-bars N, the draw-hook O, and the chains P, substantially as herein shown and described.

3. In a cultivator, the combination, with the polygonal frames H, carrying the shafts and disks I J, of the scrapers K, substantially as herein shown and described, whereby the middle part of the furrow will be cleaned, as set forth.

THOMAS B. NUTTING.

Witnesses:
JAMES T. GRAHAM,
C. SEDGWICK.